US008781276B2

(12) United States Patent
Fattal et al.

(10) Patent No.: US 8,781,276 B2
(45) Date of Patent: Jul. 15, 2014

(54) GRATING-BASED OPTICAL FIBER-TO-WAVEGUIDE INTERCONNECTS

(75) Inventors: David A. Fattal, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 13/387,025

(22) PCT Filed: Jan. 29, 2010

(86) PCT No.: PCT/US2010/022650
§ 371 (c)(1),
(2), (4) Date: Jan. 25, 2012

(87) PCT Pub. No.: WO2011/093895
PCT Pub. Date: Aug. 4, 2011

(65) Prior Publication Data
US 2012/0281950 A1 Nov. 8, 2012

(51) Int. Cl.
*G02B 6/30* (2006.01)
*G02B 6/34* (2006.01)
*G02B 6/124* (2006.01)
*G02B 6/12* (2006.01)

(52) U.S. Cl.
CPC .. *G02B 6/30* (2013.01); *G02B 6/34* (2013.01); *G02B 6/124* (2013.01); *G02B 2006/12107* (2013.01)
USPC .............................. 385/49; 385/37

(58) Field of Classification Search
None
See application file for complete search history.

(56) References Cited

U.S. PATENT DOCUMENTS

| 7,167,615 | B1* | 1/2007 | Wawro et al. | 385/37 |
|---|---|---|---|---|
| 7,298,945 | B2* | 11/2007 | Gunn et al. | 385/37 |
| 7,650,052 | B2* | 1/2010 | Krishnamoorthy et al. | 385/14 |
| 8,265,435 | B2* | 9/2012 | Fu et al. | 385/37 |
| 2004/0114642 | A1 | 6/2004 | Bullington et al. | |
| 2005/0254751 | A1 | 11/2005 | Ushiro et al. | |
| 2009/0290837 | A1* | 11/2009 | Chen et al. | 385/37 |
| 2010/0092128 | A1* | 4/2010 | Okayama | 385/14 |
| 2011/0129231 | A1* | 6/2011 | Fiorentino et al. | 398/141 |

FOREIGN PATENT DOCUMENTS

| JP | 04-349230 | 12/1992 |
|---|---|---|
| WO | WO-2009043880 | 4/2009 |

OTHER PUBLICATIONS

Shin, W., et al., Microstructured fiber end surface grating for coarse WDM signal monitoring, IEEE Photonics Technology Letters, vol. 19, No. 8, pp. 550-552, Apr. 15, 2007.

* cited by examiner

*Primary Examiner* — Michelle R Connelly

(57) ABSTRACT

Embodiments of the present invention are directed to optical waveguide-to-fiber interconnects. In one aspect, an optical fiber-to-waveguide interconnect includes a grating coupler (102) located at the end of a waveguide, and a grating layer (110) disposed on the end of an optical fiber (112). The optical fiber includes a core (118) and the grating layer includes a planar, non-periodic, sub-wavelength grating (116). Light carried by the waveguide into the grating coupler is output and coupled into the core via the sub-wavelength grating, and light transmitted along the core to the grating layer is directed by the sub-wavelength grating into the grating coupler for transmission in the waveguide.

11 Claims, 15 Drawing Sheets

US 8,781,276 B2

GRATING-BASED OPTICAL FIBER-TO-WAVEGUIDE INTERCONNECTS

TECHNICAL FIELD

Embodiments of the present invention relate to optical fiber-to-waveguide couplers.

BACKGROUND

Coupling light between optical fibers and waveguides is an indispensable part of any on- and off-chip optical communication system. However, coupling light from an optical fiber into a waveguide, or coupling light from a waveguide into an optical fiber, presents a number of problems. For example, conventional techniques for coupling light from a. waveguide into an optical fiber include configuring the end of the waveguide to scatter the light carried by the waveguide and positioning a lens at or near the end the optical fiber to direct a portion of the scattered light in the optical fiber core. For multimode fibers, a lens, can be used to direct the maximal ray of the focused beam within the numerical aperture of the fiber core, in this way the light captured by the lens can be effective coupled into the fiber core. On the other hand, in order to couple light into a single mode fiber, the mode of the fiber core and the mode of the light captured by the lens must be closely matched.

One conventional technique to couple light between a single mode fiber and a waveguide is to use a grating coupler. Light coming from the waveguide propagates through the grating and is scattered in free space at some finite angle from normal. The collecting fiber therefore needs to be positioned at an angle from normal for efficient coupling. Normal input/output operation is possible but not very efficient doe to the coupling between left and right propagating waves in the grating region. Although positioning the fiber at an angle can be done, it often complicates the design and packaging of the chip.

Physicists and engineers continue to seek enhancements that reduce the cost and increase the efficiency of optical fiber-to-waveguide couplers.

DETAILED DESCRIPTION

Figure 1:
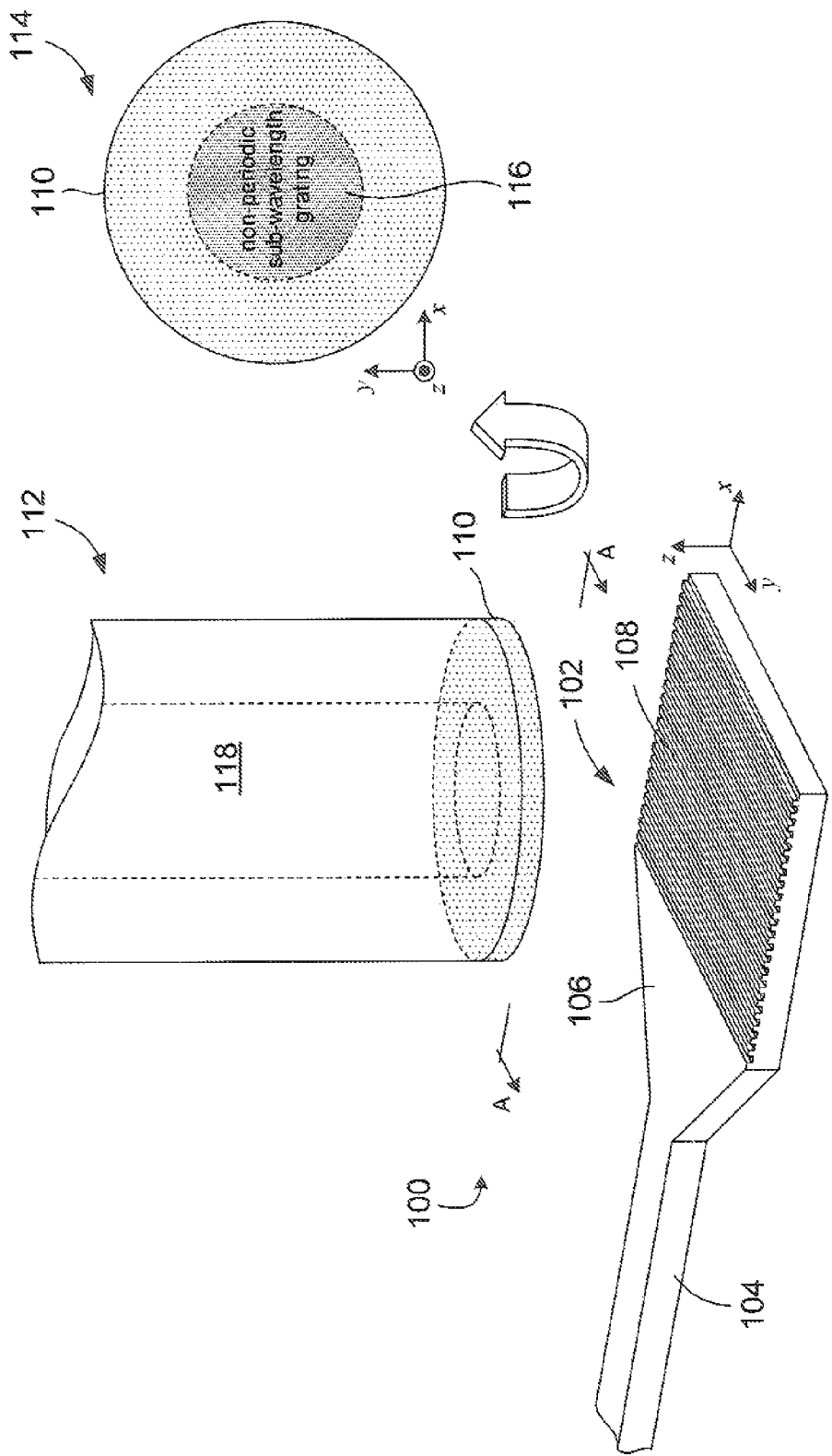
FIG. 1 shows an isometric view of an example optical fiber-to-waveguide interconnect configured in accordance with one or more embodiments of the present invention.

Embodiments of the present invention are directed to optical waveguide-to-fiber interconnects. FIG. 1 shows an isometric view of an example optical fiber-to-waveguide interconnect 100 configured in accordance with one or more embodiments of the present invention. The interconnect 100 includes a grating coupler 102 formed at the end of a waveguide 104. As shown in the example of FIG. 1, the grating coupler 102 includes a tapered waveguide 106 and a grating block 108. The grating block 108 includes a grating composed of a series of lines separated by grooves oriented approximately perpendicular to the waveguide 104. The interconnect 100 also includes a grating layer 110 disposed on a planarized end of an optical fiber 112. FIG. 1 also includes an end-on-view 114 of the grating layer 110, revealing the grating layer includes a planar, non-periodic, sub-wavelength grating ("SWG") 116. The SWG 116 is located approximately in the center of the grating layer 110 and is dimensioned to cover the end of the core 118 of the optical fiber 112. FIG. 1 also reveals the grating coupler 102 and the grating layer 110 are separated by air space and the end portion of the optical fiber 112 is oriented substantially perpendicular to the plane of the grating coupler 102.

As shown in FIG. 1, the waveguide 104 has a considerably smaller cross-sectional area than the cross-sectional area of the core 118. The optical fiber 112 can be a single mode fiber or a multimode fiber. For example, in certain embodiments, the width of the waveguide can range from approximately 2-4 μm, the diameter of the core 118 for a single mode fiber can range from approximately 8-12 μm, and the diameter of the core 118 for a multimode fiber can range from approximately 20-70 μm. The interconnect 100 can be operated to couple light from the smaller dimensioned waveguide 104 into the relatively larger dimensioned core 118, and the interconnect 100 can be operated in reverse to couple light from the core 118 into the waveguide 104.

Figure 2A:
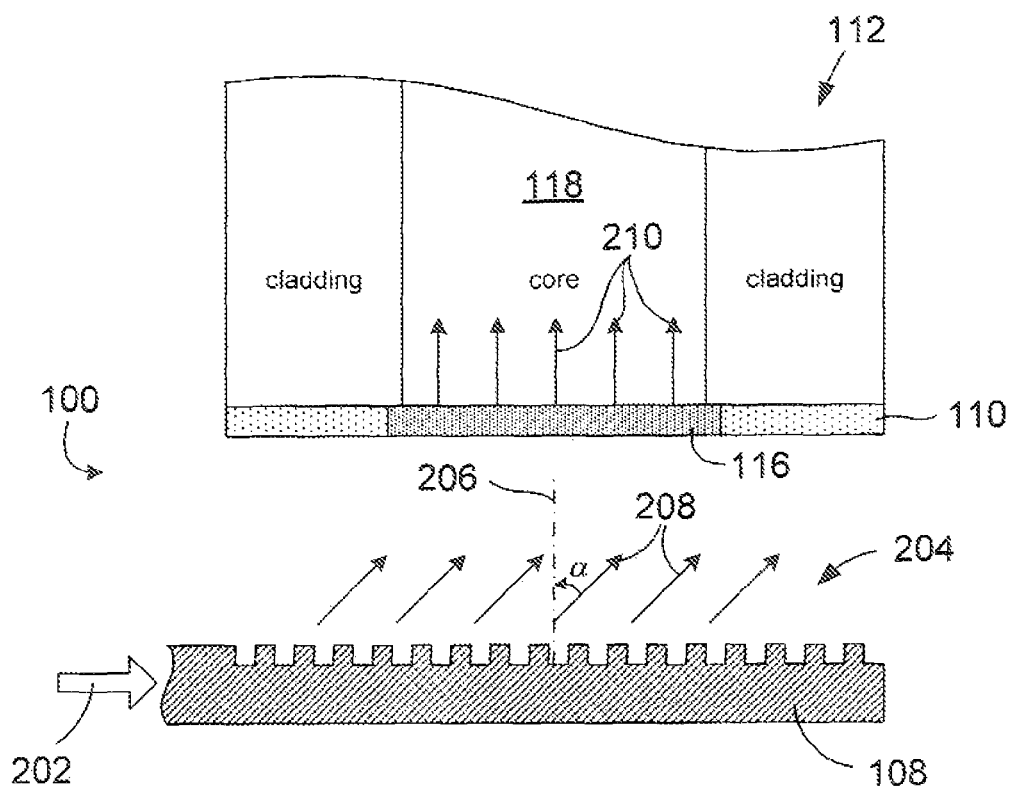
FIGS. 2A-2B show cross-sectional views of the interconnect along a line A-A, shown in FIG. 1, operated in accordance with embodiments of the present invention.

When the interconnect 100 is operated to couple light carried by the waveguide 104 into the core 118, light is. transmitted along the waveguide 104 into the tapered waveguide 106 where the light spreads out and enters the grating block 108. FIG. 2A shows a cross-sectional view of the interconnect 100, along a line A-A shown in FIG. 1, operated to couple light from the waveguide 104 into the core 118 in accordance with one or more embodiments of the present invention. A grating 204 formed within the grating block 108 causes light 202 to exit the grating block 108 with an angle α to normal 206, as indicated by directional arrows 208. The SWG 116 is configured so that light exiting the grating block 108, and incident on the SWG 116 with the angle α, is transmitted into the core 118, as indicated by directional arrows 210.

Figure 2B:
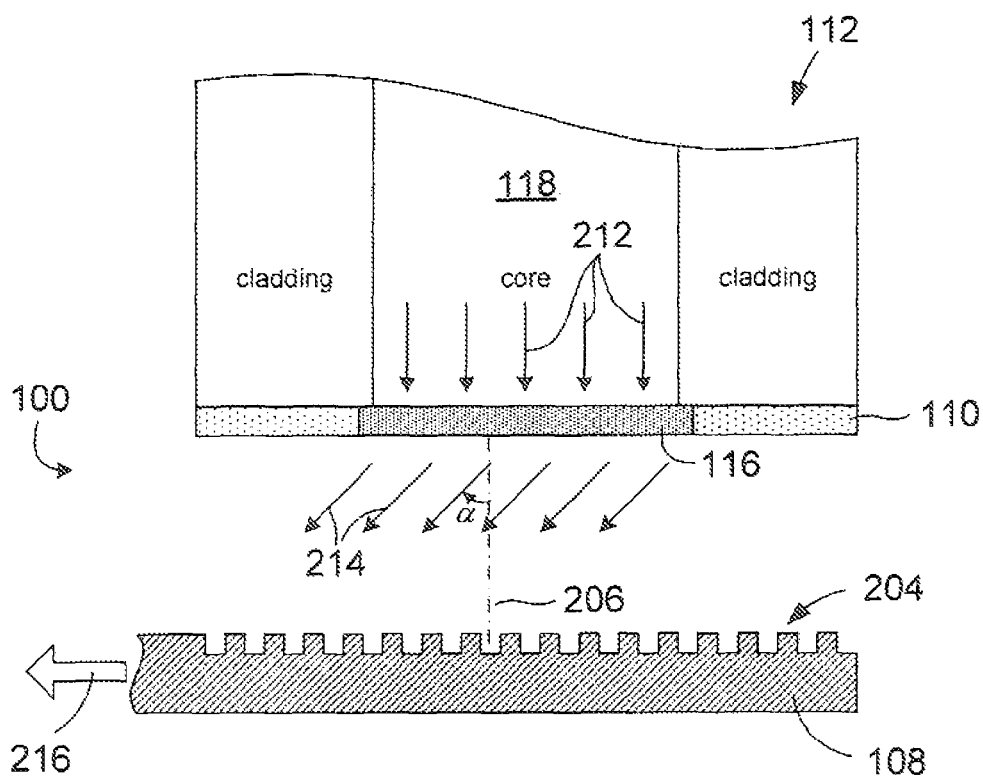

FIG. 2B shows a cross-sectional view of the interconnect 100, along the line A-A shown in FIG. 1 operated to couple light from the core 118 into the waveguide 104 in accordance with one or more embodiments of the present invention, fn FIG. 2B, light transmitted along the core 118 to sub-wavelength grating 116 is represented by directional arrows 212. The SWG 116 is configured so that the light transmitted through the SWG 116 is incident on the grating 204 with the angle α, represented by directional arrows 214. The grating 204 captures the light exiting the SWG 116. The light 216 exits the grating block 108 and is funneled by the tapered waveguide 106 into the narrower waveguide 104. Note that the SWG 116 is configured to direct the light at the grating block 108 with the angle α so that the light can be tunneled into the waveguide 104.

As shown in FIGS. 2A-2B, the SWG 116 avoids the need to tilt the optical fiber in order to collect light output from the grating block 108. The SWG 116 can also operate as an antireflective coating by trapping incident light and projecting the light from the near field into the far field, as described below with reference to FIG. 4.

The waveguide 104, tapered waveguide 106, and grating block 108 can be formed as a single solid substantial piece of or integral, semi conductor or dielectric material. Semiconductors include, but are not limited to, elemental semiconductors, such as silicon ("Si") and germanium ("Ge"); and compound semiconductors. Compound semiconductors include III-V compound semiconductors and II-VI compound semiconductors. III-V compound semiconductors are composed of column IIIa elements selected from boron ("B"), aluminum ("Al"), gallium ("Ga"), and indium ("In") in combination with column Va elements selected from nitrogen ("N"), phosphorus ("P"), arsenic ("As"), and antimony ("Sb"). III-V compound semiconductors are classified according to the relative quantities of III and V elements, such as binary compound semiconductors, ternary compound semiconductors, quaternary compound semiconductors. For example, binary semiconductor compounds include, but are not limited to, GaAs, GaAl, InP, InAs, and GaP; ternary compound semiconductors include, but are not limited to, $In_yGa_{y-1}As$ or $GaAs_yP_{1-y}$, where y ranges between 0 and 1; and quaternary compound semiconductors, include, but are not limited to, $In_xGa_{1-x}As_yP_{1-y}$, where both x and y independently range between 0 and 1. II-VI compound semiconductors are composed of column IIb elements selected from zinc ("Zn"), cadmium ("Cd"), mercury ("Hg") in combination with VIa elements selected from oxygen ("Q"), sulfur ("S") and selenium ("Se"). For example, suitable II-VI compound semiconductors includes, but not limited to, CdSe, ZnSe, ZnS, and ZnO are examples of binary II-VI compound semiconductors. Suitable dielectric materials include silicon oxide ("$SiO_2$"), aluminum oxide ("$Al_2O_3$"), and silicon carbide ("SiC").

The grating coupler 102 can be formed by first depositing the material using chemical vapor deposition, physical vapor deposition, or wafer bonding on a substrate. The waveguide 104, tapered waveguide 106, and grating block 108 with grating 204 can then be formed using nanoimprint lithography, photolithography, reactive ion etching, focusing beam milling, or any other suitable well-known method for forming ridge waveguides and gratings.

Planar Non-Periodic Sub-Wavelength Gratings

Figure 3A:
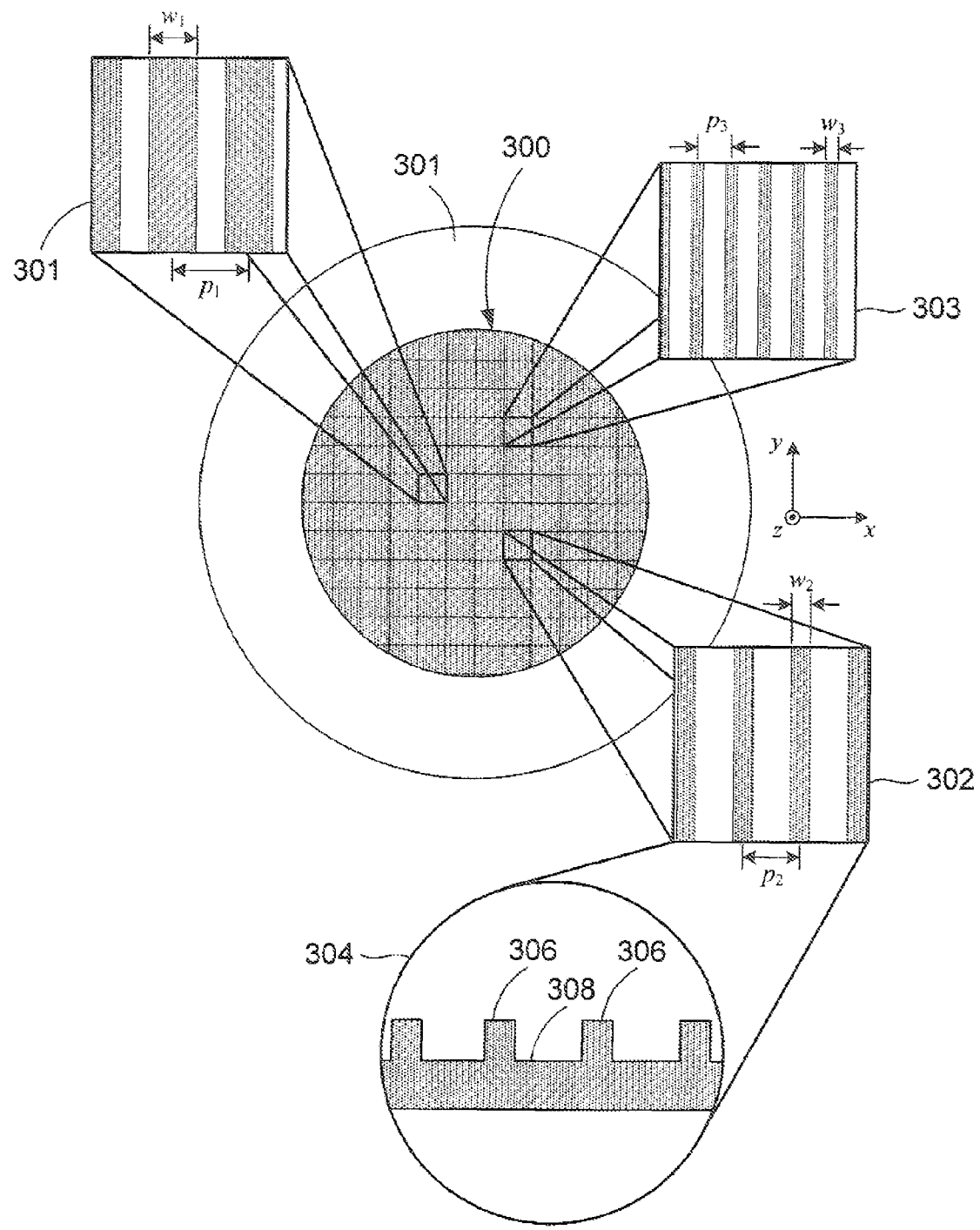
FIGS. 3A-3C show top plan views of sub-wavelength gratings configured with one-dimensional and two-dimensional sub-wavelength grating patterns in accordance with one or more embodiments of the present invention.

FIG. 3A shows a top plan view of a SWG 300 configured with a one-dimensional grating pattern formed in a grating layer 301 in accordance with one or more embodiments of the present invention. The one-dimensional grating pattern is composed of a number of one-dimensional grating sub-patterns. In the example of FIG. 3A, three grating sub-patterns 301-303 are enlarged. In the embodiment represented in FIG. 3A, each grating sub-pattern comprises a number of regularly spaced wire-like portions of the grating layer 102 material called "lines" formed in the grating layer 301. The lines extend in the y-direction and are periodically spaced in the x-direction. FIG. 3A also includes an enlarged end-on view 304 of the grating sub-pattern 302. The lines 306 are separated by grooves 308. Each sub-pattern can be characterized by a particular periodic spacing of the lines and by the line width in the x-direction. For example, the sub-pattern 301 comprises lines of width $w_1$ separated by a period $p_1$ the sub-pattern 302 comprises lines with width $w_2$ separated by a period $p_2$, and the sub-pattern 303 comprises lines with width $w_3$ separated by a period $p_3$. In other embodiments, the line spacing, thickness, and periods can be continuously varying.

The grating sub-patterns 301-303 form sub-wavelength gratings that preferentially transmit incident light polarized in one direction, i.e., the x-direction, provided the periods $p_1$, $p_2$, and $p_3$ are smaller than the wavelength of the incident light. For example, the lines widths can range from approximately 10 nm to approximately 300 nm and the periods can range from approximately 20 nm to approximately 1 μm depending on the wavelength of the incident light. The light transmitted through a region acquires a phase θ determined by the line thickness t, and the duty cycle η defined as:

$$\eta = \frac{w}{p}$$

where w is the line width and p is the periodic spacing of the lines.

The SWG 300 can be configured to apply a particular phase change to transmitted light while maintaining a very high transmissivity. The one-dimensional SWG 300 can be configured to transmit light the je-polarized component or the y-polarized component of incident light by adjusting the period, line width and line thickness of the lines. For example, a particular period, line width and line thickness may be suitable for transmitting the x-polarized component but not for transmitted the y-polarized component; and a different period, line width and line thickness may be suitable for transmitting the y-polarized component but not for transmitting the x-polarized component.

Figure 3B:
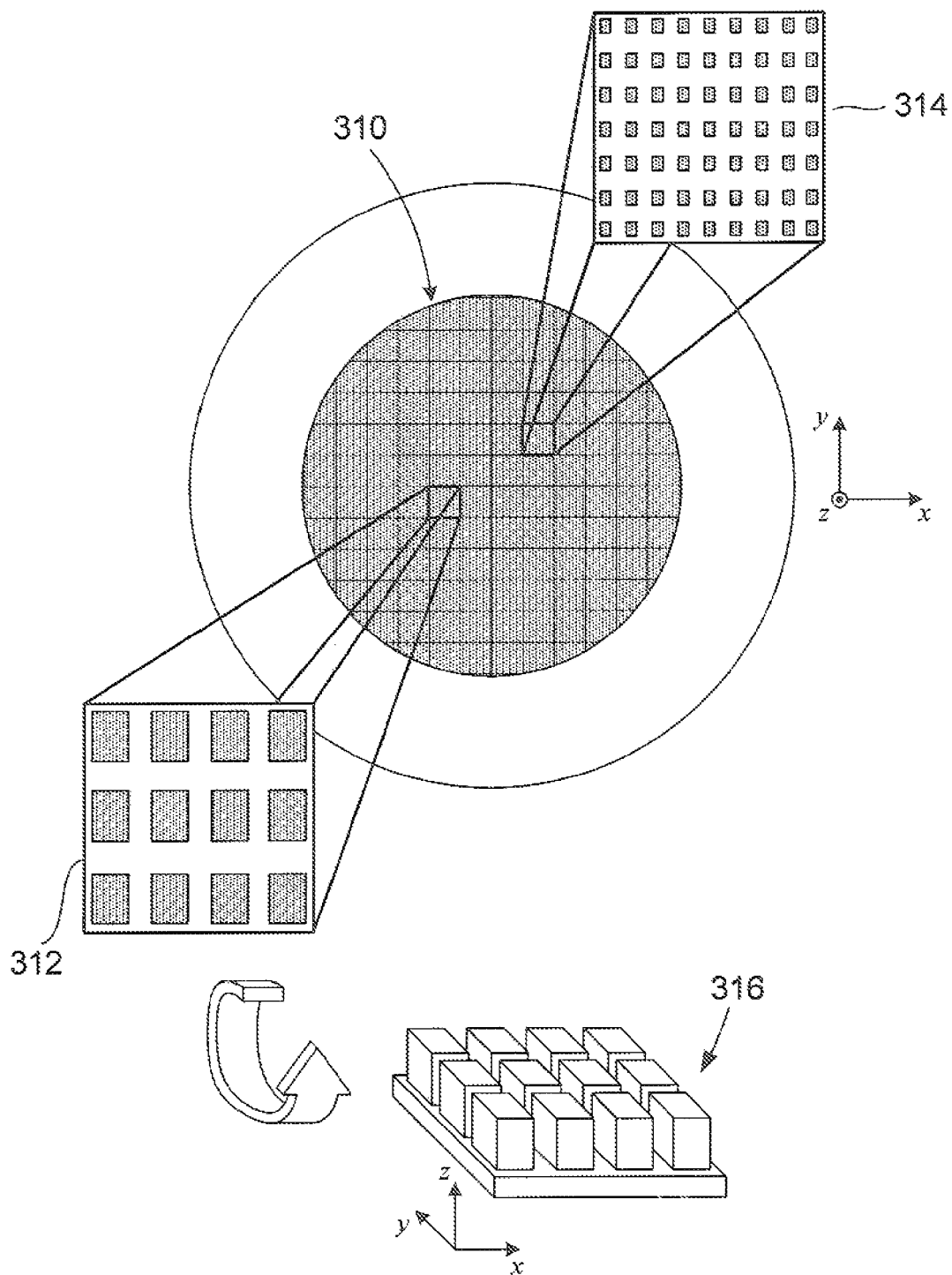
Figure 3C:
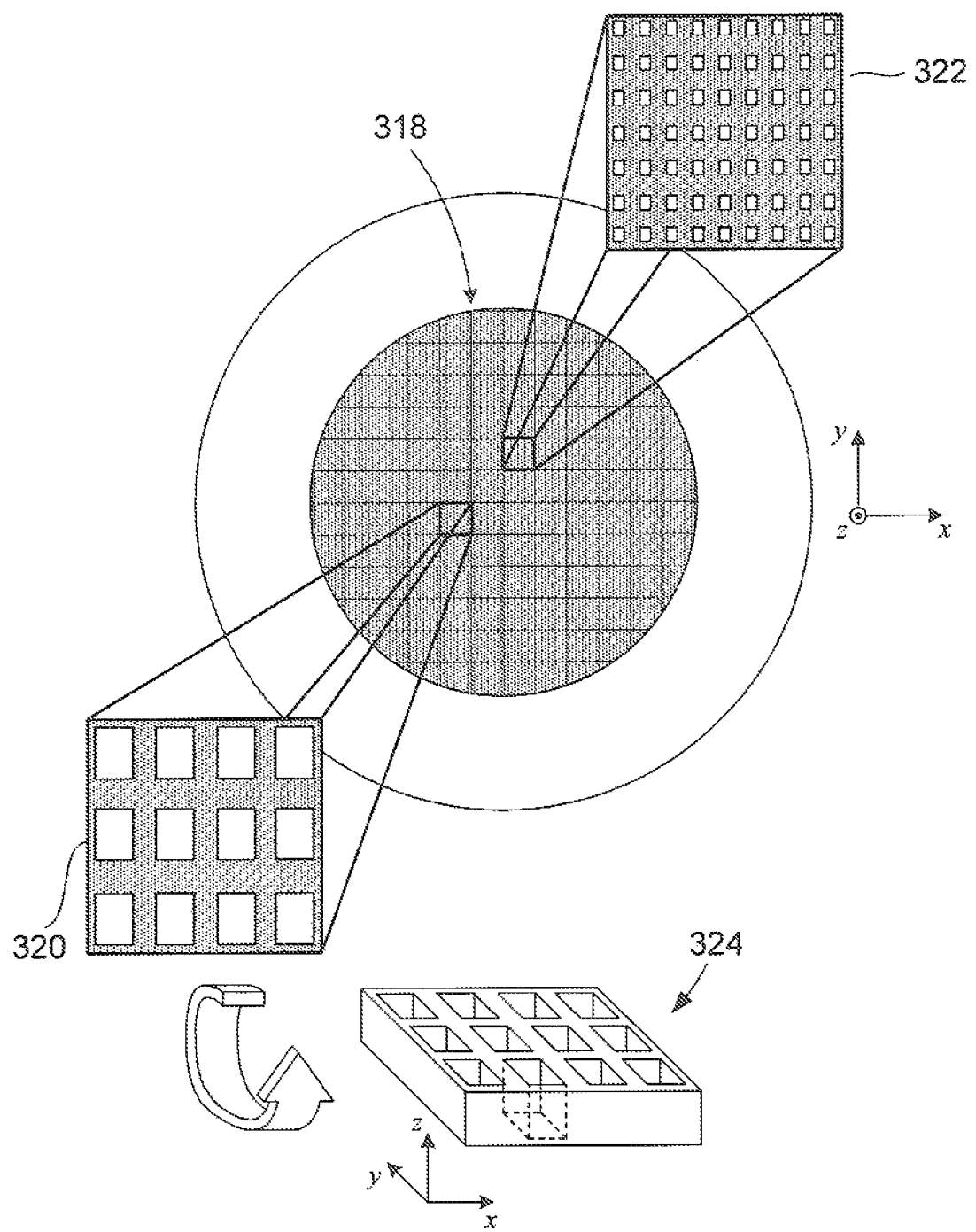

Embodiments of the present invention are not limited to one-dimensional SWGs. A SWG can be configured with a two-dimensional, non-periodic grating pattern to transmit polarity insensitive light. FIGS. 3B-3C show top plan views of two example grating layers including two-dimensional SWGs in accordance with one or more embodiments of the present invention. In the example of FIG. 3B, the SWG 310 is composed of posts rather lines separated by grooves. The duty cycle and period can be varied in the x- and y-directions. Enlargements 312 and 314 show top views of two different rectangular-shaped post sizes. FIG. 3B includes an isometric view 316 of posts comprising the enlargement 312. Embodiments of the present invention are not limited to rectangular-shaped posts, in other embodiments the posts can be square, circular, elliptical, or any other suitable shape. In the example of FIG. 3C, the SWG 318 is composed of holes rather than posts. Enlargements 320 and 322 show two different rectangular-shaped hole sizes. The duty cycle can be varied in the x- and y-directions. FIG. 3C includes an isometric view 324 of the enlargement 320. Although the holes shown in FIG. 3C are rectangular shaped, in other embodiments, the holes can be square, circular, elliptical or any other suitable shape.

Note that although the one-dimensional and two-dimensional grating patterns are described as being composed of sub-patterns, in practice, the period, duty cycle, and thickness of the lines, posts, and holes of the one- and two-dimensional gratings can be continuously varying.

Figure 4:
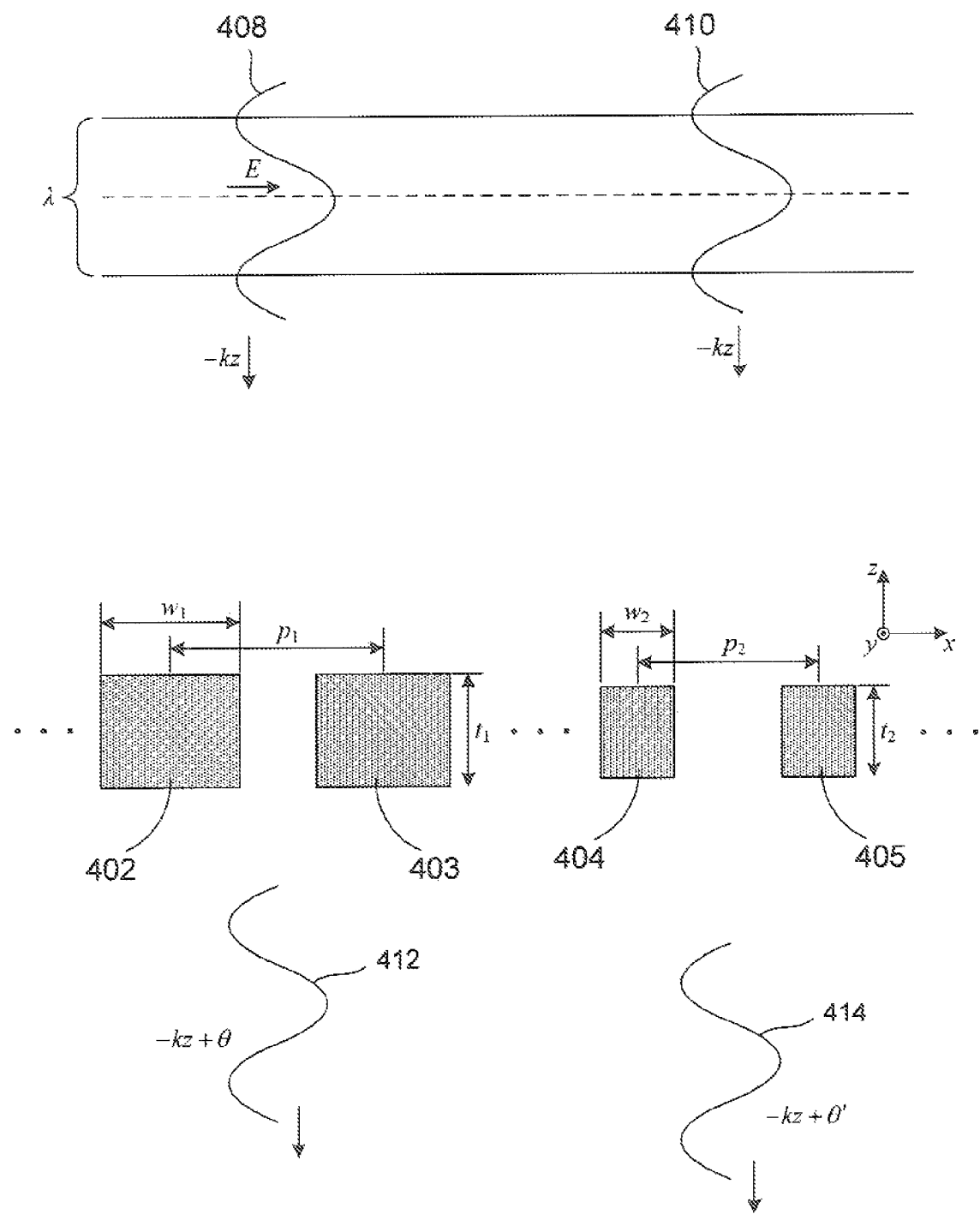
FIG. 4 shows a cross-sectional view of lines from two separate grating sub-patterns revealing the phase acquired by transmitted light in accordance with one or more embodiments of the present invention.

FIG. 4 shows a cross-sectional view of lines from two separate regions of an example SWG revealing the phase acquired by transmitted light in accordance with one or more embodiments of the present invention. For example, lines 402 and 403 can be lines in a first region of the SWG, and lines 404 and 405 can be lines in a second region of the same SWG. The thickness $t_1$ of the lines 402 and 403 is greater than the thickness $t_2$ of the lines 404 and 405, and the duty cycle $\eta_1$ associated with the lines 402 and 403 is also greater than the duty cycle $\eta_1$ associated with the lines 404 and 405. Light polarized in the x-direction and incident on the lines 402-405 becomes trapped by the lines 402 and 403 for a relatively longer period of time than the portion of the incident light trapped by the lines 404 and 405. The grating then projects the light from the near field into the far field. As a result, the portion of light transmitted through the lines 402 and 403 acquires a larger phase shift than the portion of light transmitted through the lines 404 and 405. As shown in the example of FIG. 4, the incident waves 408 and 410 strike the lines 402-405 with approximately the same phase, but the wave 412 transmitted through the lines 402 and 403 acquires a relatively larger phase shift $\theta$ than the phase $\theta'$ (i.e., $\theta > \theta'$) acquired by the wave 414 transmitted through the lines 404 and 405.

Figure 5:
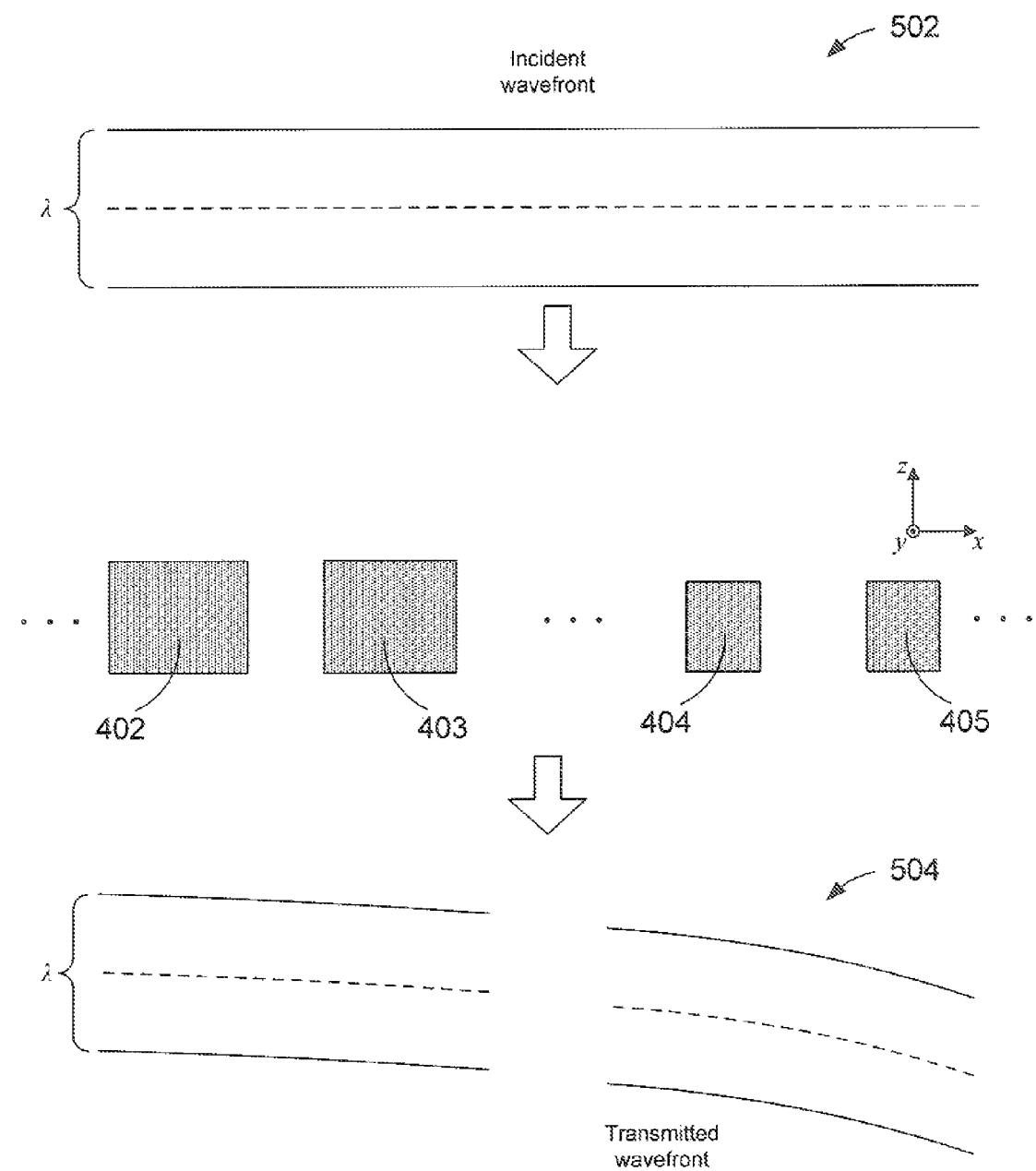
FIG. 5 shows a cross-sectional view of lines from two separate grating sub-patterns revealing how the transmitted wavefront changes in accordance with one or more embodiments of the present invention.

FIG. 5 shows a cross-sectional view of the lines 402-405 revealing how the transmitted wavefront changes in accordance with one or more embodiments of the present invention. As shown in the example of FIG. 5, incident light with a substantially uniform wavefront 502 strikes the lines 402-405 producing transmitted light with a curved transmitted wavefront 504. The curved wavefront 504 results from portions of the incident wavefront 502 interacting with the lines 402 and 403 with a relatively larger duty cycle $\eta_1$ and thickness $t_1$ than portions of the same incident wavefront 502 interacting with the lines 404 and 405 with a relatively smaller duty cycle $\eta_2$ and thickness $t_2$. The shape of the transmitted wavefront 504 is consistent with the larger phase acquired by light striking the lines 402 and 403 relative to the smaller phase acquired by light, striking the lines 404 and 405.

Figure 6:
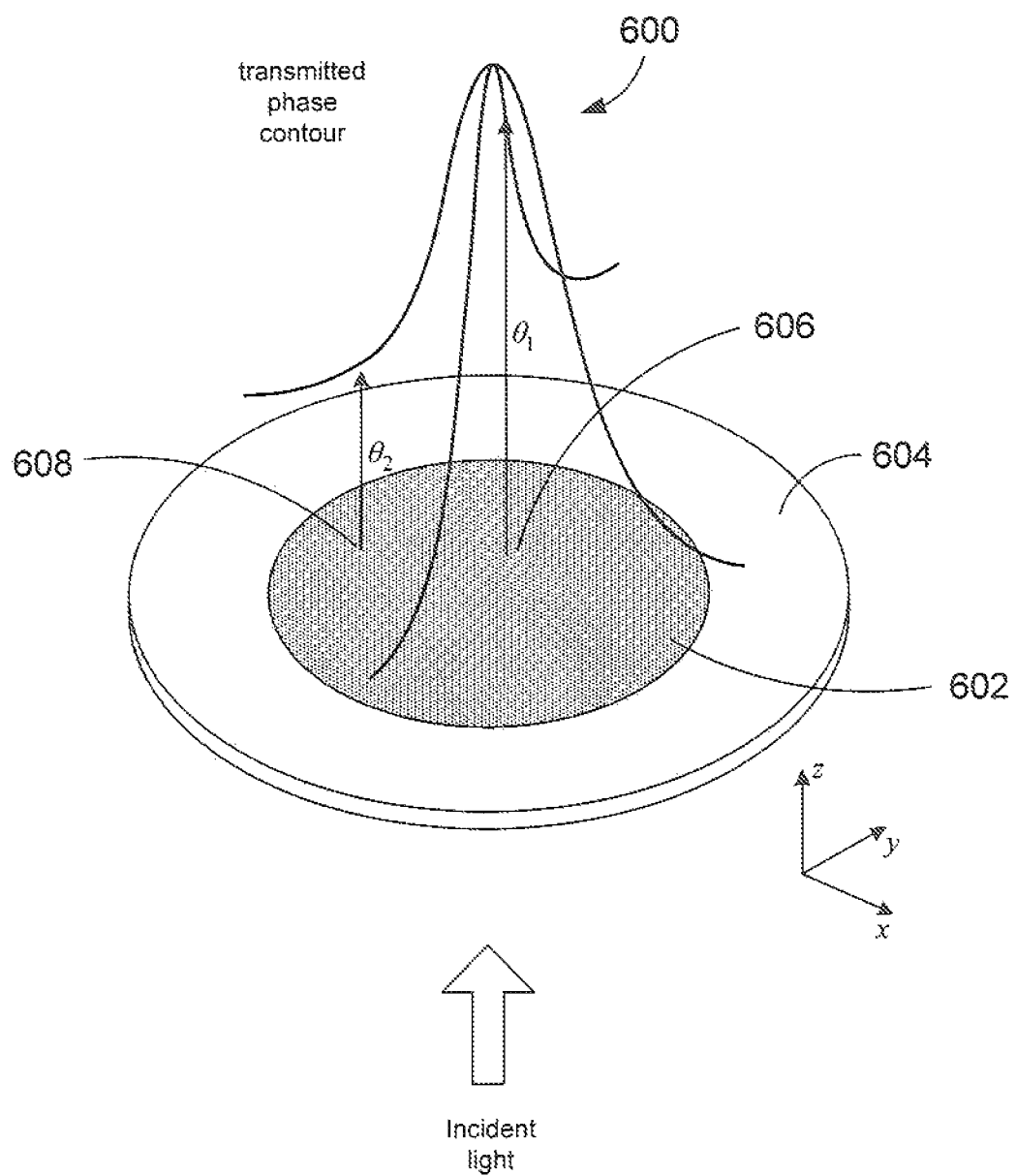
FIG. 6 shows an isometric view of an example transmitted phase change contour map produced by a sub-wavelength grating pattern configured in accordance with one or more embodiments of the present invention.

FIG. 6 shows an isometric view of an exemplary phase change contour map 600 produced by a particular SWG 602 of a grating layer 604 in accordance with one or more embodiments of the present invention. The contour map 600 represents the magnitude of the phase change acquired by light transmitted through the SWG 602. In the example shown in FIG. 6, the SWG 602 produces a contour map 602 with the largest magnitude in the phase acquired by the light transmitted near the center of the SWG 602 and with the magnitude of the phase acquired by transmitted light decreasing away from the center of the SWG 602. For example, light transmitted through a region 606 acquires a phase of $\theta_1$, and light transmitted through a region 608 acquires a phase of $\theta_2$. Because $\theta_1$ is much larger than $\theta_2$, the light transmitted through the regions 606 acquires a much larger phase than the light transmitted through the region 608.

The phase change in turn shapes the wavefront of light transmitted through a SWG. For example, as described above with reference to FIGS. 4 and 5, a region having a relatively larger duty cycle produces a larger phase shift in transmitted light than a region having a relatively smaller duty cycle. As a result, a portion of a wavefront transmitted through a region with a large duty cycle lags behind a second portion of the same wavefront transmitted through a different region with smaller duty cycle. Embodiments of the present invention include patterning the SWG to control the phase change and ultimately the shape of the transmitted wavefront so that the SWG can be operated similar to a prism.

Figure 7A:
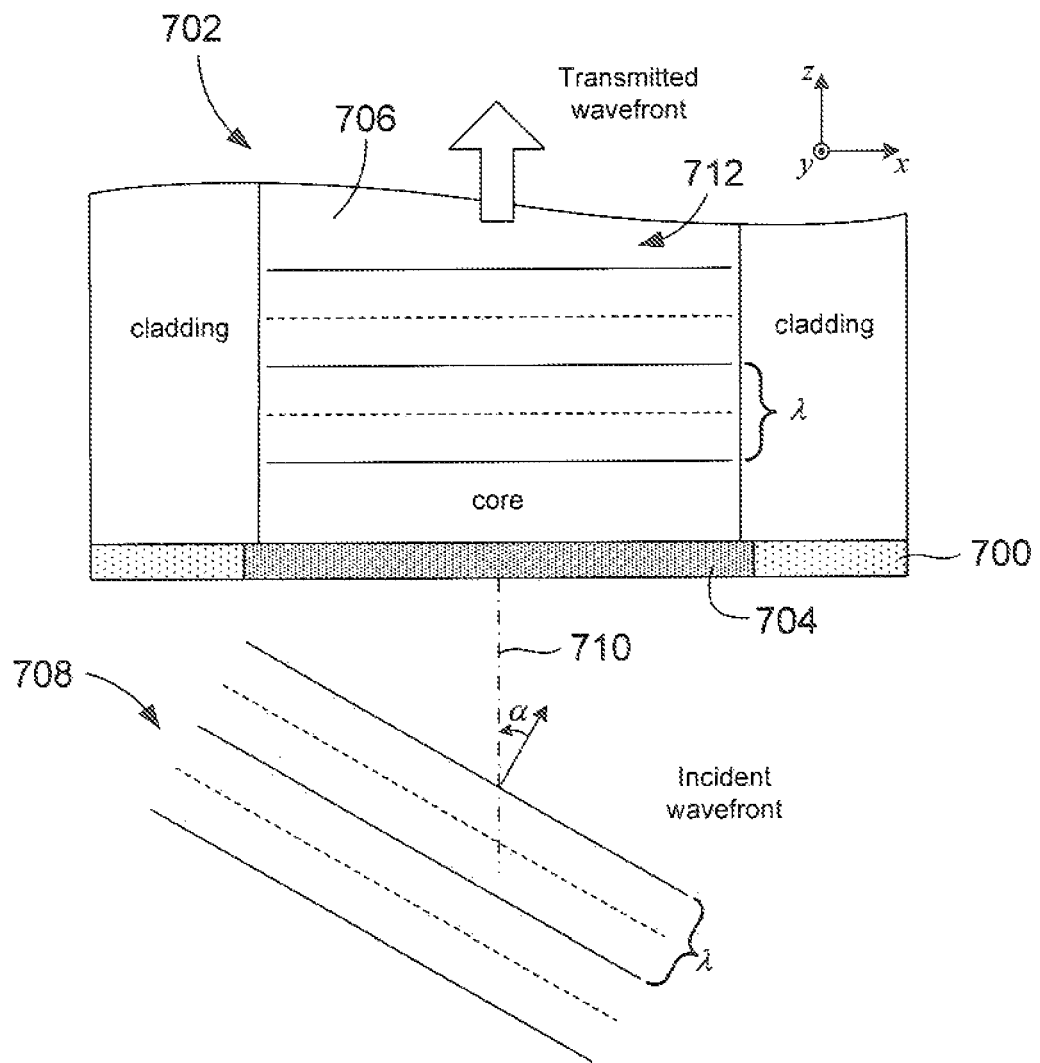
FIGS. 7A-7B show a side view of a first example grating layer attached to an end of an optical fiber and operated in accordance with embodiments of the present invention.
Figure 7B:
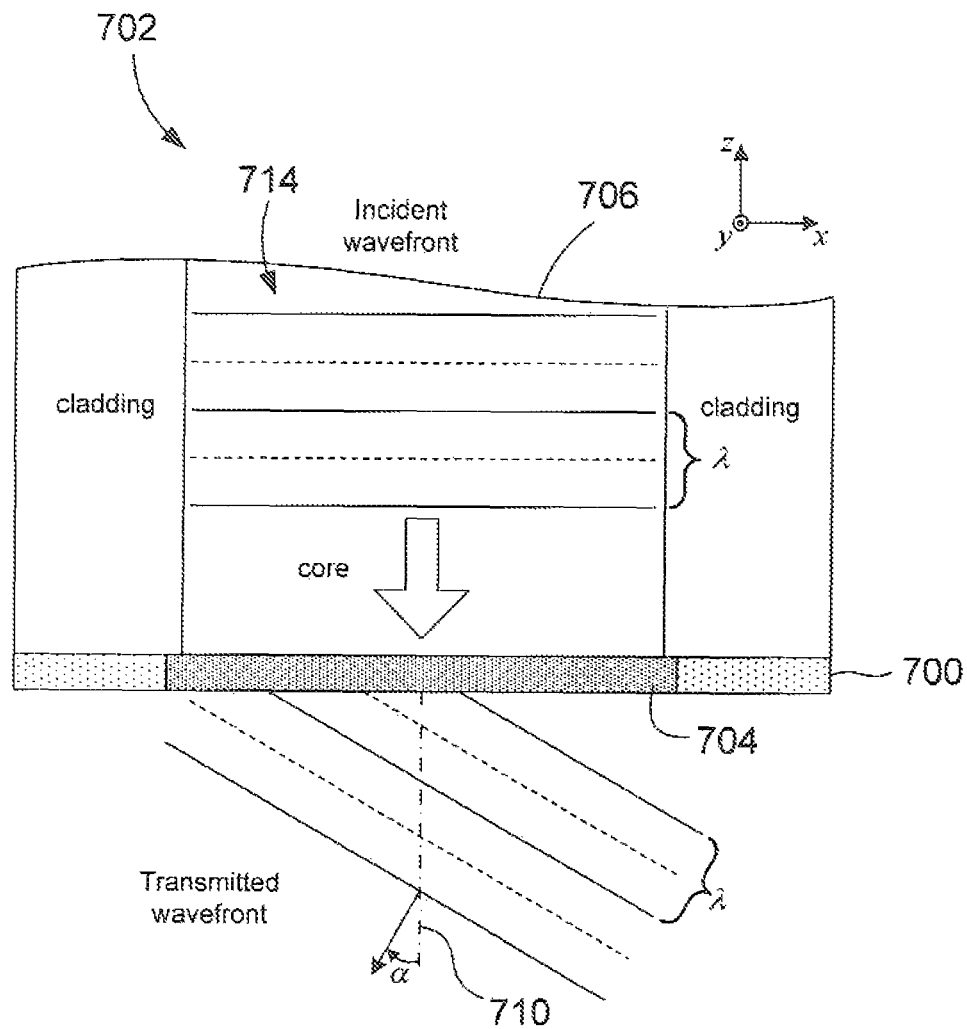

FIGS. 7A-7B shows a side view of an example grating layer 700 attached to an. end of an optical fiber 702 and operated in accordance with embodiments of the present invention. As shown in FIGS. 7A-7B, the grating layer 700 includes a SWG 704 configured to transmit light with a wavelength $\lambda$. In the example of FIG. 7A, light incident on the SWG 704 is represented by incident wavefront 708 and strikes the SWG 704 at an angle of incidence $\alpha$ to the normal 710. The SWG 704 is configured to linearly vary the phase of the incident wavefront 708 to produce transmitted wavefront 712, which propagates along the core 706. In the example of FIG. 7B, incident light with the wavelength $\lambda$ propagating along the core 706 to the SWG 704 is represented by incident wavefront 714. The incident light is transmitted through the SWG 104 with a transmitted angle $\alpha$ to produce transmitted wavefront 716. In other embodiments, the SWG 704 can be configured to produce a transmitted wavefront with any desired shape, or the SWG 704 can be configured to scatter incident light into the core 706.

Note that the optical fiber 702 can be a single mode fiber or a multimode fiber. For a single mode fiber, the SWG 704 can be configured with dimensions that support coupling the $TEM_{00}$ mode into and out of the core 706. For multimode fibers, the SWG 704 can be configured with larger dimensions to support coupling other $TEM_{mn}$ modes into and out of the fiber core 706.

Designing and Fabricating Sub-Wavelength Gratings

Figure 8:
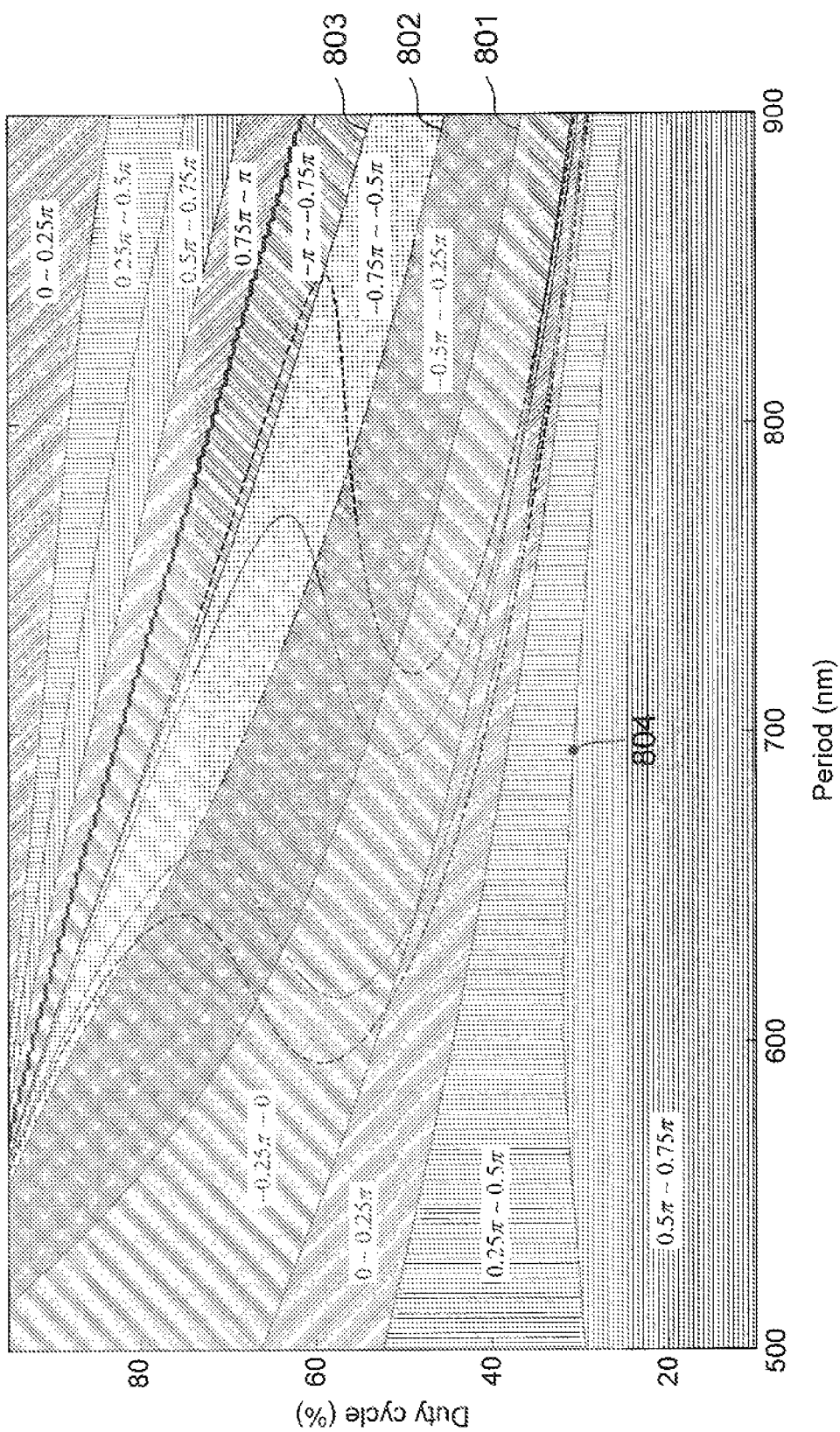
FIG. 8 shows a transmitted phase contour plot of phase variation as a function of period and duty cycle obtained in accordance with one or more embodiments of the present invention.

A SWG can be designed to transmit incident light and introduce a desired phase front by varying the period and duty cycle. FIG. 8 shows a phase contour plot for transmitted light as a function of period and duty cycle obtained in accordance with one or more embodiments of the present invention using either the well-known finite element method or rigorous coupled wave analysis. Contour lines, such as contour lines 801-803, each correspond to a particular phase acquired by light transmitted through region of a SWG with a period and duty cycle lying anywhere along the contour. The phase contours are separated by 0.25 $\pi$ rad. For example, contour 801 corresponds to periods and duty cycles that apply a phase of $-0.25$ $\pi$ rad to transmitted light, and contour 802 corresponds to periods and duty cycles that apply a phase of $-0.5$ $\pi$ rad to transmitted light. A point $(p,\eta)$ 804, corresponding to a grating period of 700 nm and 35% duty cycle introduces a phase $\theta=0.5$ $\pi$ rad. Phases between $-0.25$ $\pi$ rad and $-0.5$ $\pi$ rad are applied to light transmitted through regions of the SWG with periods and duty cycles that lie between contours 801 and 802. The phase contour can be obtained using either the application "MIT Electromagnetic Equation Propagation" ("MEEP") simulation package to model electromagnetic systems (ab-initio.mit.edu/meep/meep-1.1.1.tar.gz), or COMSGL Multiphysics® which is a finite element analysis and solver software package that can be used to simulate various physics and engineering applications (see, www.comsol.com).

The points $(p,\eta,\theta)$ represented by the phase contour plot can be used to select periods and duty cycles for a SWG that can be operated as a particular type of lens or prism. In other words, the data represented in the phase contour plot of FIG. 8 can be used to design SWG with particular optical properties. In certain embodiments, the period or duty cycle can be fixed while the other parameter is varied to design and fabricate SWGs. In other embodiments, both the period and duty cycle can be varied to design and fabricate SWGs.

Figure 9A:
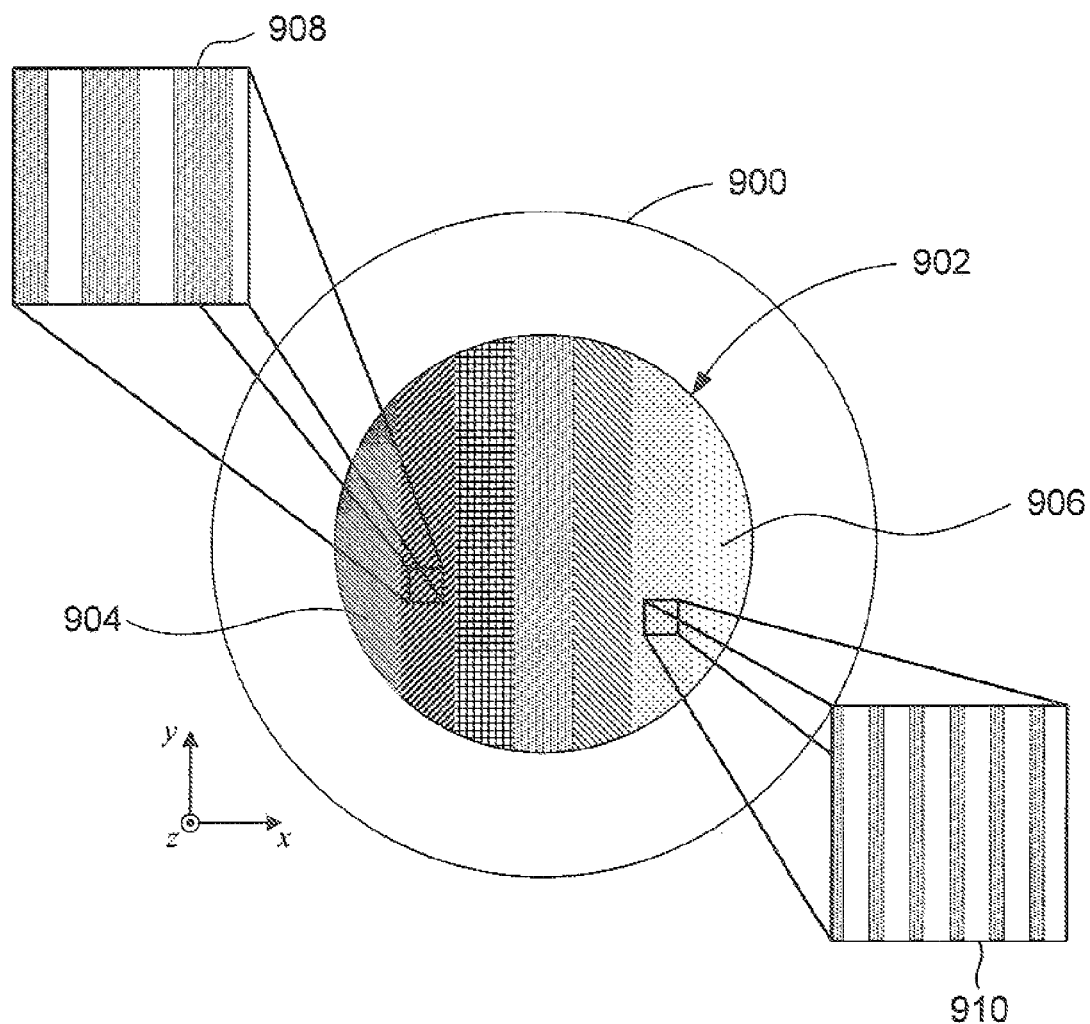
FIGS. 9A-9B show top plan views of grating layers configured with one-dimensional, non-periodic, sub-wavelength gratings in accordance with one or more embodiments of the present invention.

FIG. 9A shows a top plan view of a grating layer 900 configured with a one-dimensional SWG 902 to operate in accordance with one or more embodiments of the present invention. Each shaded region of die SWG 902 represents a different grating sub-pattern of lines extending in the y-direction, with darker shaded regions, such as region 904, representing regions with a relatively larger duty cycle than lighter shaded regions, such as region 906, FIG. 9A includes enlargements 908 and 910 of two sub-regions revealing that the lines run parallel in the y-direction. Enlargements 908 and 910 also reveal that the line width w, or duty cycle η, decreases the x-direction. The SWG 902 represents a configuration in which light of an appropriate wavelength and polarized in the x-direction is transmitted through the SWG with a linearly varying wavefront, as described above with reference to FIGS. 7A and 7B.

Figure 9B:
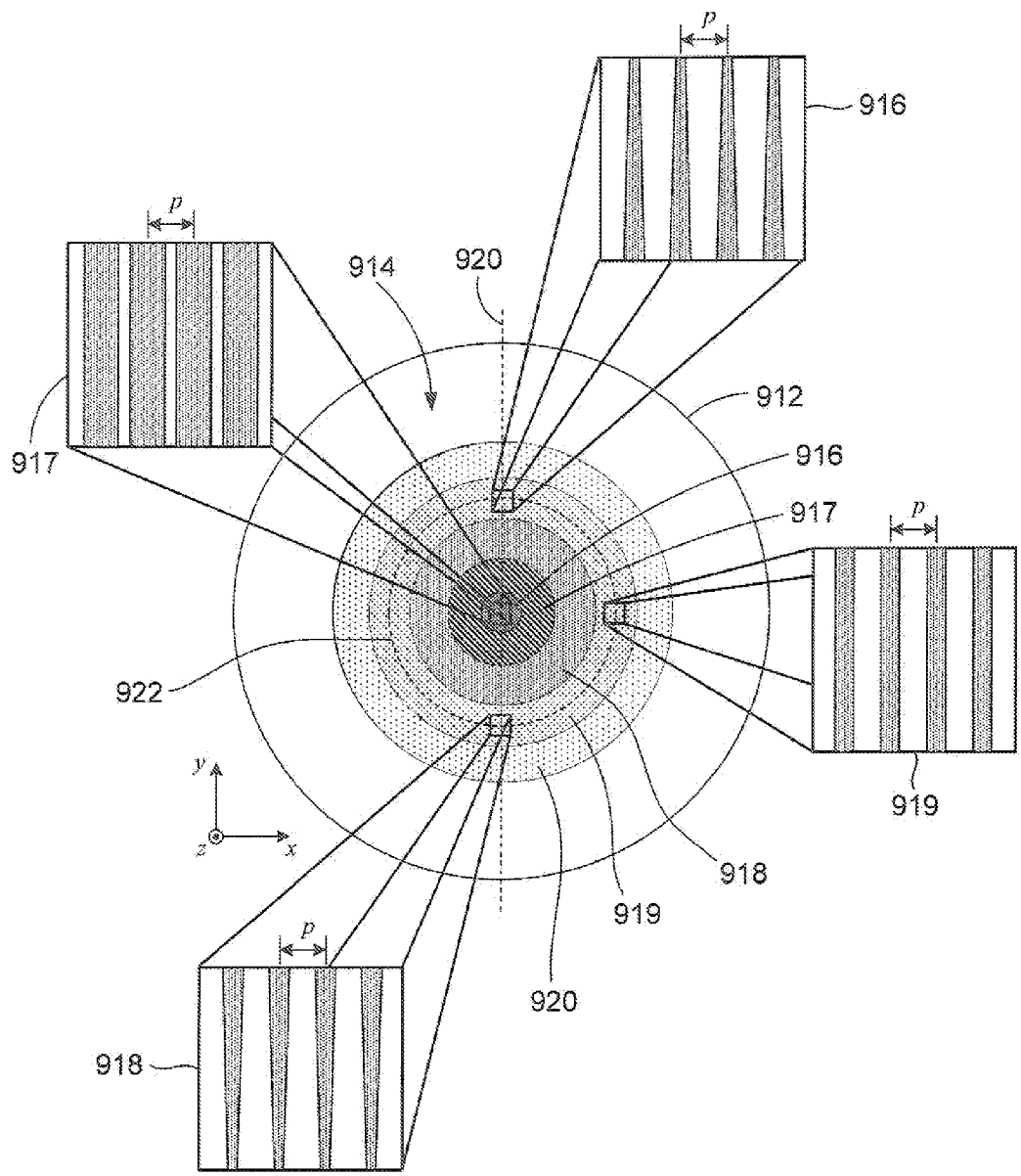

In certain embodiments, the SWG can be configured so transmit light polarized in any direction by appropriately tapering the lines of the SWG. FIG. 9B shows a top plan view of a grating layer 912 configured to operate in accordance with one or more embodiments of the present invention. The grating layer 912 includes a SWG 914 with a grating pattern represented by annular shaded regions 916-920. Each annular region represents a different grating sub-pattern of lines. Enlargements 916-919 show that the SWG 914 comprises lines tapered in the y-direction with a constant line period spacing p in the x-direction. Enlargements 916-919 are enlargements of the same lines miming parallel to dashed-line 920 in the y-direction. Enlargements 916-919 reveal that the line period spacing p remains constant but the width of the lines narrow or taper away from the center of the SWG 914 in the y-direction. Each annular region has the same duty cycle and period. For example, enlargements 916, 918, and 919 have substantially the same duty cycle. As a result, each portion of an annular region produces the same approximate phase shift in the light transmitted through the SWG 914. For example, dashed circle 922 represents a single phase shift contour in which light transmitted through the SWG anywhere along the circle 922 acquires substantially the same phase θ.

Figure 10A:
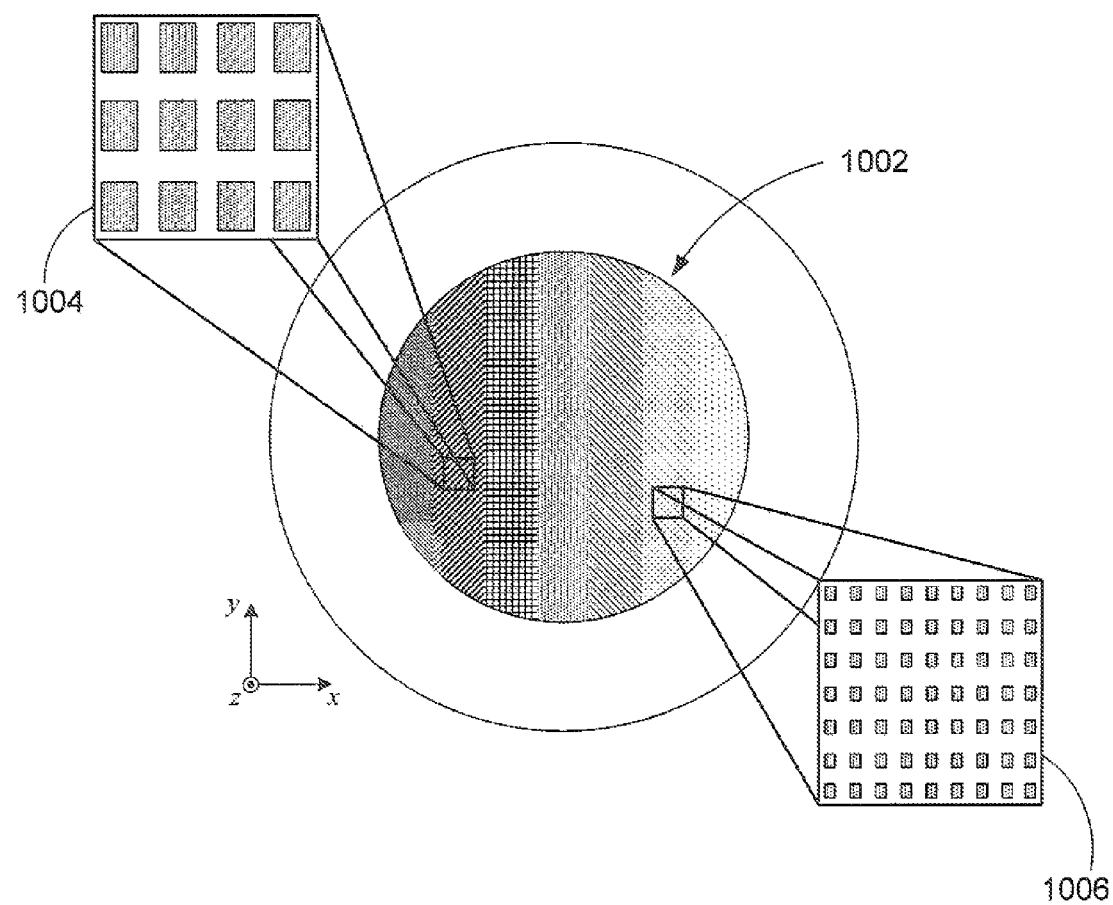
FIGS. 10A-10B show top plan views of two grating layers configured with two-dimensional, non-periodic, sub-wavelength gratings in accordance with one or more embodiments of the present invention.
Figure 10B:
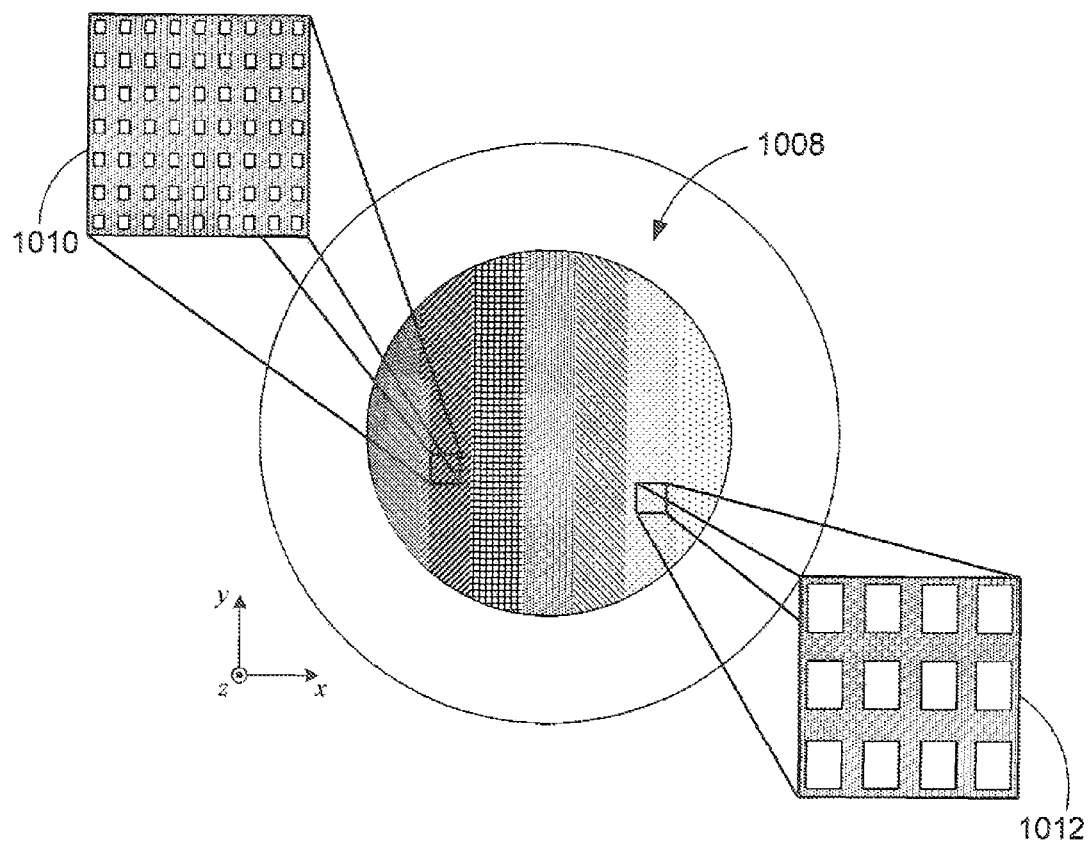

The grating layer can also be configured with a two-dimensional SWG in order to couple unpolarized incident light into or out of an optical fiber core. FIGS. 10A-10B show a top plan views of two two-dimensional SWGs in accordance with one or more embodiments of the present invention. In the example of FIG. 10A, a SWG 1002 is composed of posts as described above with reference to FIG. 3B. The duty cycle and period can be varied in the x- and y-directions. Enlargements 1004 and 1006 show the size of the posts decreasing in the x-direction. In the example of FIG. 10B, a SWG 1008 is composed of holes as described above with reference to FIG. 3C. The duty cycle and period can also be varied in the x- and y-directions. Enlargements 1010 and 1012 show the size of the holes increasing in the x-direction. The SWGs 1002 and 1008 are a configuration so that light of an appropriate is transmitted through the SWGs with a linearly varying wavefront, as described above with reference to FIGS. 7A and 7B A SWG can be fabricated in a grating layer composed of a high refractive index material. For example, the grating layer can be composed of, but is not limited to, an elemental semiconductor, a III-V semiconductor, a II-VI semiconductor, or a dielectric material. The grating layer can be deposited directly on the end of a planarized optical fiber using wafer bonding, chemical vapor deposition, or physical vapor deposition. The SWG can be formed in the grating layer using reactive ion etching, focused ion beam milling, nanoimprint lithography, or photolithography. The SWG can be formed using any suitable well-known technique.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical fiber-to-waveguide interconnect comprising:
a grating coupler (102) located at the end of a waveguide; and
a grating layer (110) disposed on the end of an optical fiber (112), the optical fiber including a core (118) and the grating layer including a planar, non-periodic, sub-wavelength grating (116), wherein light carried by the waveguide into the grating coupler is output and coupled into the core via the sub-wavelength grating, and light transmitted along the core to the grating layer is directed by the sub-wavelength grating into the grating coupler for transmission in the waveguide.

2. The interconnect of claim 1, wherein the grating coupler further comprises a tapered waveguide (106) attached to the waveguide, and a grating block attached to the tapered waveguide.

3. The interconnect of claim 2, wherein the grating coupler further comprises the waveguide, tapered waveguide, and grating block composed of an integral material.

4. The interconnect of claim 1, wherein the sub-wavelength grating further comprises a one-dimensional grating pattern (300).

5. The interconnect of claim 1, wherein the sub-wavelength grating further comprises a two-dimensional grating pattern (310,318).

6. The interconnect of claim 1, wherein the sub-wavelength grating further comprises a grating pattern configured to couple light output from the grating coupler and incident on the sub-wavelength at a particular angle of incidence into the core.

7. The interconnect of claim 1, wherein the sub-wavelength grating further comprises a grating pattern configured to couple light output from the core into the grating block at a particular angle of incidence.

8. The interconnect of claim 1, wherein the grating coupler and the grating layer are separated by air space.

9. The interconnect of claim 1, wherein the optical fiber and the grating coupler further comprise the optical fiber oriented approximately perpendicular to the plane of the grating coupler.

10. The interconnect of claim 1, wherein the optical fiber further comprises a multimode fiber.

11. The interconnect of claim 1, wherein the optical fiber further comprises a single mode fiber.

* * * * *